United States Patent Office

3,730,940
Patented May 1, 1973

3,730,940
FLAME RETARDANT COMPOSITION
John Versnel, Plainsboro, and Joseph Green, East Brunswick, N.J., assignors to Cities Service Company, New York, N.Y.
No Drawing. Filed Oct. 1, 1971, Ser. No. 185,831
Int. Cl. C08f 45/04
U.S. Cl. 260—41 A                9 Claims

ABSTRACT OF THE DISCLOSURE

A non-drip, self-extinguishing composition comprises polypropylene, a halogenated organic flame retardant, ammonium fluoborate or ammonium sulfate, a metal compound synergist such as antimony trioxide, and silica. The flame retardant is ordinarily a halogenated aliphatic compound, i.e., a compound having halo substituents on aliphatic or cycloaliphatic carbon atoms.

BACKGROUND OF THE INVENTION

Field of the invention

This invention relates to self-extinguishing polypropylene compositions and more particularly relates to non-drip, self-extinguishing polypropylene compositions containing a halogenated organic flame retardant.

Description of the prior art

It is known that polypropylene may be rendered self-extinguishing by the incorporation of a halogenated organic flame retardant. It is also known that most self-extinguishing polypropylene compositions have the disadvantage of dripping when exposed to a flame. Although dripping may sometimes be prevented by using high concentrations of flame retardant, this solution to the problem is economically unattractive. It would obviously be desirable to find a more attractive method of rendering self-extinguishing polypropylene compositions non-dripping.

SUMMARY OF THE INVENTION

An object of this invention is to provide non-drip, self-extinguishing polypropylene compositions.

Another object is to provide such compositions containing about 5–10% by weight of a halogenated organic flame retardant.

These and other objects are attained by blending polypropylene with about 2–10% by weight of a halogenated organic flame retardant, about 5–10% by weight of ammonium fluoborate or ammonium sulfate, about 5–10% by weight of a metal compound synergist, and about 15–25% by weight of silica, all percentages being based on the total weight of the composition.

DESCRIPTION OF THE PREFERRED EMBODIMENTS

The polypropylene is combined with the other ingredients so as to constitute about 55–70%, preferably about 60%, by weight of the composition.

The halogenated flame retardant may be any of the halogenated organic flame retardants conventionally used in polypropylene compositions. However, it is preferably a halogenated aliphatic flame retardant, i.e., a compound having halo substituents on aliphatic or cycloaliphatic carbon atoms. These preferred flame retardants may contain aromatic carbon atoms as well as the required aliphatic and/or cycloaliphatic carbon atoms, and the halo substituents may be chloro and/or bromo. Exemplary of utilizable flame retardants are tetrabromoethane; pentachloroethane; hexabromoethane; hexachloroethane, tetrachlorodibromoethane; phenylhexabromodecane; 2,3,3-tribromoallyl 2,4,6-tribromophenyl ether; N,N',N''-tris(2,3-dibromopropionyl)-trimethylene triamine; methylene-bis (1,2-dibromo-1-methylpropionamide); 2,3-dibromobuten-2-diol-1,4; bis(2,3,3-tribromoallyl) maleate; bis(2-bromoethyl)-2-chloroethyl phosphate; esters of 2,3-dihalopropanol - 1, such as tris(2,3-dibromopropyl) isocyanurate, tris(2,3-dibromopropyl) phosphate, tris(2,3-dichloropropyl) phosphate, etc.; halogenated oligomers of butadiene or isoprene having a degree of polymerization of 2–2000, such as the tetrabromocyclooctanes, dibromoethyldibromocyclohexanes, hexabromocyclododecanes, etc.; the halogenated cyclopentadiene adducts described in U.S. Pat. 3,418,263, such as the 2:1 adduct of hexachlorocyclopentadiene and cyclooctadiene-1,5, etc.; the polybrominated 1:1 Diels-Alder adducts described below, such as 5,6 - dibromo - 1,10,11,12,13,13-hexachlorotricyclo[8,2,1, 0$^{2,9}$]tridecene-11 (i.e., the dibrominated 1:1 Diels-Alder adduct of hexachlorocyclopentadiene and cyclooctadiene-1,5), etc.; the cyclic imides described below, such as N-2,3 - dibromopropy 1 -5,6-dibromonorbornane-2,3-dicarboximide, etc.

The aforementioned polybrominated 1:1 Diels-Alder adducts are adducts of a polyhalocyclopentadiene and a polyunsaturated aliphatic or cycloaliphatic hydrocarbon containing at least four, usually 4–20, carbon atoms. They correspond to the formula:

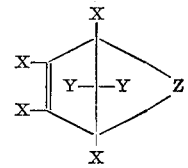

wherein X is chloro or bromo, Y is halo, hydrogen, alkyl, or alkoxy, and Z is a divalent polybromo aliphatic or cycloaliphatic hydrocarbon radical containing at least four carbon atoms and at least two bromo substituents, the free valences being on adjacent carbon atoms. When Y is alkyl or alkoxy, it usually contains 1–16, preferably 1–5, carbon atoms. The preferred flame retardants are those in which X is chloro, Y is chloro, bromo, or fluoro, and Z is a polybromo cyloaliphatic hydrocarbon radical containing 5–16 carbon atoms and 2–6 bromo substituents. These adducts and methods for preparing them are more fully disclosed in copending application S.N. 115,081, filed Feb. 12, 1971, in the name of Jack Newcombe, the teachings of which are incorporated herein by reference.

The aforementioned cyclic imides are compounds containing the structure:

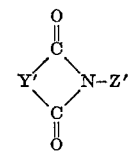

wherein Z' is a hydrocarbon, chlorinated hydrocarbon, or brominated hydrocarbon radical and Y' is a divalent radical corresponding to one of the formulas:

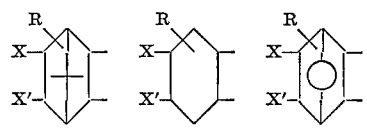

wherein X is chloro or bromo, X' is hydrogen, chloro, or bromo, and R is hydrogen or methyl. Z may be alkyl, alkenyl, aryl, aralkenyl, aralkyl, alkaryl, or cycloaliphatic or a halogenated derivative of such radicals but is preferably phenyl, tolyl, benzyl, or 2,3-dibromopropyl. The preferred imides for use in the present invention are those in which Y' corresponds to the formula:

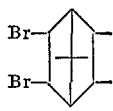

These imides and methods for preparing them are more fully disclosed in copending application S.N. 183,696, filed, September 24, 1971, in the names of Anderson O. Dotson, Jr., Jack Newcombe, and Lionel T. Wolford, the teachings of which are incorporated herein by reference.

As mentioned above, the flame retardant and the ammonium fluoborate or ammonium sulfate are employed in respective concentration of about 2–10 and about 5–10%, based on the total weight of the composition. When one of these components is employed in an amount approaching its minimum concentration, it is usually desirable to employ the other component in an amount approaching its maximum concentration. Each of these components is utilizable in an amount higher than 10% by weight, but the use of larger amounts of the components is economically less desirable. The flame retardant is preferably employed in a concentration of about 3–10%, more preferably about 5–10%.

The metal compound employed as a synergist in the compositions of the invention may be any of the metal compounds conventionally employed as synergists for halogenated flame retardants. Thus, it may be an organometallic compound but is usually an oxide or sulfide of a polyvalent metal such as antimony, arsenic, bismuth, tin, or titanium. The preferred synergist is antimony trioxide.

Although the compositions of the invention may be prepared by any suitable technique, they are usually prepared by mixing the additives with molten polypropylene to provide an intimate admixture.

The compositions of the invention are particularly advantageous in that they have non-drip and self-extinguishing properties at a low concentration of flame retardant. When tested in accordance with Underwriters' Laboratories Test 94, they have ratings of SE–O or SE–I.

The following examples are given to illustrate the invention and are not intended as a limitation thereof. Unless otherwise specified, parts mentioned are parts by weight.

EXAMPLE I—CONTROL

Blend 90 parts of polypropylene with (a) 5 parts of the dibrominated 1:1 Diels-Alder adduct of hexachlorocyclopentadiene and cyclooctadiene-1,5 and (b) 5 parts of antimony trioxide on a two-roll mill. The composition has an oxygen index of 25.5 and a UL–94 rating of SE–II.

EXAMPLE II

Blend 60 parts of polypropylene with (a) 5 parts of the dibrominated 1:1 Diels-Alder adduct of hexachlorocyclopentadiene and cyclooctadiene-1,5, (b) 5 parts of antimony trioxide, (c) 20 parts of finely-divided silica, and (d) 10 parts of ammonium fluoborate on a two-roll mill. The composition has an oxygen index of 25.2 and a UL–94 rating of SE–I.

EXAMPLE III

Blend 60 parts of polypropylene with (a) 10 parts of the dibrominated 1:1 Diels-Alder adduct of hexachlorocyclopentadiene and cyclooctadiene-1,5, (b) 10 parts of antimony trioxide, (c) 15 parts of finely-divided silica, and (d) 5 parts of ammonium sulfate on a two-roll mill. The composition has an oxygen index of 24.6 and a UL–94 rating of SE–I.

EXAMPLE IV

Blend 60 parts of polypropylene with (a) 5 parts of N-2,3-dibromopropyl-5,6-dibromonorbornane - 2,3 - dicarboximide, (b) 5 parts of antimony trioxide, (c) 25 parts of finely-divided silica, and (d) 5 parts of ammonium fluoborate on a two-roll mill. The composition has an oxygen index of 25.5 and a UL–94 rating of SE–I.

EXAMPLE V

Prepare three compositions by repeating Example IV except for replacing the imide flame retardant with, respectively, tetrabromocyclooctane, dibromoethyldibromocyclohexane, and hexabromocyclododecane. The compositions have oxygen, indices of 26.6, 26.2, and 26.6, respectively; and each of the compositions has a UL–94 rating of SE–I.

It is obvious that many variations may be made in the products and processes set forth above without departing from the spirit and scope of this invention.

What is claimed is:

1. A self-extinguishing composition comprising about 55–70% by weight of polypropylene, about 2–10% by weight of a halogenated organic flame retardant, about 5–10% by weight of ammonium fluoborate or ammonium sulfate, about 5–10% by weight of antimony trioxide, and about 15–25% by weight of silica.

2. The composition of claim 1 wherein the concentration of polypropylene is about 60% by weight.

3. The composition of claim 1 wherein the flame retardant is a halogenated aliphatic compound.

4. The composition of claim 3 wherein the flame retardant is a halogenated aliphatic compound corresponding to the formula

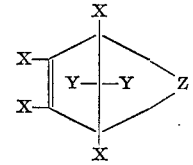

wherein X is chloro or bromo, Y is halo, hydrogen, alkyl, or alkoxy, and Z is a divalent polybromo aliphatic or cycloaliphatic hydrocarbon radical containing at least four carbon atoms and at least two bromo substituents, the free valences being on adjacent carbon atoms; and the concentration of the flame retardant is about 5–10% by weight.

5. The composition of claim 4 wherein the flame retardant is a dibrominated 1:1 Diels-Alder adduct of hexachlorocyclopentadiene and cyclooctadiene-1,5.

6. The composition of claim 3 wherein the flame retardant is a halogenated aliphatic compound containing the structure

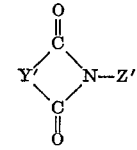

wherein Z' is a hydrocarbon, chlorinated hydrocarbon, or brominated hydrocarbon radical and Y' is a divalent radical corresponding to one of the formulas

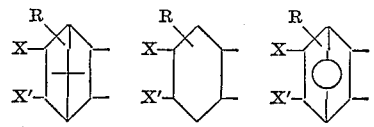

wherein X is chloro or bromo, X' is hydrogen, chloro, or bromo, and R is hydrogen or methyl.

7. The composition of claim 6 wherein the flame retardant is N-2,3-dibromopropyl-5,6-dibromonorbornane-2,3-dicarboximide.

8. The composition of claim 3 wherein the flame retardant is a halogenated butadiene or isoprene oligomer having a degree of polymerization of 2–2000.

9. The composition of claim 8 wherein the flame retardant is tetrabromocyclooctane, dibromomethyldibromocyclohexane, or hexabromocyclododecane.

(References on following page)

References Cited

UNITED STATES PATENTS

| | | | |
|---|---|---|---|
| 3,239,482 | 3/1966 | Rapp | 260—41 |
| 3,510,429 | 5/1970 | Iserson et al. | 106—15 FP |
| 3,483,158 | 12/1969 | Beachman | 106—15 FP |
| 3,419,518 | 12/1968 | Mahling et al. | 260—41 |
| 3,418,263 | 12/1968 | Hindersinn et al. | 106—15 FP |
| 2,795,589 | 6/1957 | Bluestone | 260—326 C |
| 3,542,805 | 11/1970 | Cyba | 260—326 C |
| 3,257,267 | 6/1966 | Hay | 106—15 FP |

MORRIE LIEBMAN, Primary Examiner

J. H. DERRINGTON, Assistant Examiner

U.S. Cl. X.R.

106—15 FP; 260—41 B, 45.7 R, 45.75 R, 45.8 N, 45.8 NZ, 45.9 R, 326 C, 326 HL